(12) United States Patent
Trevathan et al.

(10) Patent No.: US 10,740,080 B2
(45) Date of Patent: Aug. 11, 2020

(54) PREVIEW AND PUBLISHING OF MOBILE APPLICATIONS

(71) Applicant: Kony, Inc., Orlando, FL (US)

(72) Inventors: Matthew B. Trevathan, Roswell, GA (US); Keith Katz, Orlando, FL (US); Matthew A. Terry, Celebration, FL (US)

(73) Assignee: KONY, INC., Orlando, FL (US)

( * ) Notice: Subject to any disclaimer, the term of this patent is extended or adjusted under 35 U.S.C. 154(b) by 193 days.

(21) Appl. No.: 15/135,796

(22) Filed: Apr. 22, 2016

(65) Prior Publication Data

US 2017/0308368 A1     Oct. 26, 2017

(51) Int. Cl.
  *G06F 8/65* (2018.01)
  *G06F 8/71* (2018.01)
  *G06F 8/60* (2018.01)
(52) U.S. Cl.
  CPC .................. *G06F 8/65* (2013.01); *G06F 8/60* (2013.01); *G06F 8/71* (2013.01)
(58) Field of Classification Search
  CPC .......... G06F 8/65; G06F 8/71; G06F 8/60–66; G06F 8/70–71
  USPC .......................................................... 717/169
  See application file for complete search history.

(56) References Cited

U.S. PATENT DOCUMENTS

| 8,949,370 B1* | 2/2015 | Wu ....................... H04W 4/003 |
| | | 709/203 |
| 9,076,176 B2* | 7/2015 | Fosback ............. G06Q 30/0603 |
| 2009/0319651 A1* | 12/2009 | Fang ......................... G06F 9/54 |
| | | 709/223 |
| 2011/0314067 A1* | 12/2011 | Teraguchi ........... G06F 17/3012 |
| | | 707/821 |
| 2012/0110564 A1* | 5/2012 | Ran ........................... G06F 8/65 |
| | | 717/173 |
| 2013/0036094 A1* | 2/2013 | Fippel .................... G06Q 10/06 |
| | | 707/640 |
| 2013/0262626 A1* | 10/2013 | Bozek ..................... H04L 67/10 |
| | | 709/217 |
| 2014/0026113 A1* | 1/2014 | Farooqi ..................... G06F 8/34 |
| | | 717/107 |
| 2014/0095874 A1* | 4/2014 | Desai .................. H04L 63/0815 |
| | | 713/168 |
| 2014/0282399 A1* | 9/2014 | Gorelik ..................... G06F 8/71 |
| | | 717/122 |
| 2015/0350344 A1* | 12/2015 | Sugimura ............... H04L 67/16 |
| | | 709/202 |
| 2017/0048339 A1* | 2/2017 | Straub ..................... H04L 67/22 |
| 2017/0075670 A1* | 3/2017 | Lazar ........................ G06F 8/61 |

* cited by examiner

*Primary Examiner* — Todd Aguilera
(74) *Attorney, Agent, or Firm* — Andrew M. Calderon; Roberts Calderon Safran & Cole, P.C.

(57) ABSTRACT

The present disclosure relates to mobile applications and, more particularly, to systems and processes of automated application publishing using back end systems. A method is implemented in a computer infrastructure having computer executable code tangibly embodied on a computer readable storage medium and having programming instructions operable to: automatically generating a unique identification for each version of an app uploaded to a back end system; and uploading the app and its collateral with the unique identification to one or more management instances which are compatible with the back end system.

16 Claims, 5 Drawing Sheets

PREVIEW AND PUBLISHING OF MOBILE APPLICATIONS

FIELD OF THE INVENTION

The present disclosure relates to mobile applications and, more particularly, to systems and processes of automated application publishing using back end systems.

BACKGROUND

Currently for an enterprise to deploy an application (e.g., app) created by a development tool there is a significant amount of manual effort involved, even when using an Enterprise Mobility Management (EMM) solution and/or Mobile Application Management (MAM) solution. In the industry, the standard is for an administrator to receive the application (e.g., app) binary file and collateral information (e.g., screenshots, platform specific icons, guidebooks, etc.) and then manually upload all of it to a distribution solution, e.g., enterprise store. This creates significant workload to process and maintain vast catalogues of apps and upgrades, as well as being an error prone system.

Further, for a developer working on an app (new or an upgrade), there is commonly a need to deploy the app in a beta stage to devices to obtain real world testing and feedback. Installing the app requires handing the app off to an EMM/MAM solution administrator, to be manually deployed as described above to a select group of testers. Complicating the process further, these beta apps commonly need to be manually removed from user's devices and the app server. Additionally, when the app is an upgrade version, frequently the test users already have a production version of the app on their device that would be in conflict with the beta version.

SUMMARY

In an aspect of the invention, a method is implemented in a computer infrastructure having computer executable code tangibly embodied on a computer readable storage medium and having programming instructions operable to: automatically generating a unique identification for each version of an app uploaded to a back end system; and uploading the app and its collateral with the unique identification to one or more management instances which are compatible with the back end system.

In another aspect of the invention, computer program product comprises a computer readable storage medium having program instructions embodied therewith. The program instructions being executable by a back end system server to cause the back end system server to: receive one or more mobile apps and collateral information in the back end system server; generate a unique identification, in the back end system server, for each of the one or mobile apps; and publish for preview the one or more mobile applications in at least one management instance which is compatible with the back end system server using one or more rest APIs.

In a further aspect of the invention, a system includes a CPU, a computer readable memory and a computer readable storage medium. The system further includes one or more program instructions. The program instructions are operable to: automatically generate a unique identification for an app and its collateral that is uploaded to an enterprise system; program instructions to publish the app and its collateral with the unique identification in a management instance which is compatible with the enterprise system through a catalog of APIs; and program instructions to flag the app as live for publishing to one or more targeted devices as defined by an administrator of the enterprise system. The program instructions are stored on the computer readable storage medium for execution by the CPU via the computer readable memory.

DETAILED DESCRIPTION

The present disclosure relates to mobile applications and, more particularly, to systems and processes of automated application publishing using back end systems. More specifically, the present disclosure provides automated app preview lifecycle management and final app publishing capabilities to multiple enterprise stores (e.g., management instances), while avoiding conflicts on a targeted mobile device. In embodiments, the systems and processes also permit publishing from any MBaaS to any compatible EMM/MAM solution (management instance) and subsequent upload to a mobile device. The systems and processes described herein can also append policies to the app such as, expiry, auto purge, user access, etc.

System Environment

The present invention may be embodied as a system, method or computer program product. The present invention may take the form of a hardware embodiment, a software embodiment or a combination of software and hardware. Furthermore, the present invention may take the form of a computer program product embodied in any tangible storage medium of expression having computer-usable program code embodied in computer readable storage medium.

The computer readable storage medium is not a transitory signal per se, and is any tangible medium that can contain and store the program for use by or in connection with an instruction execution system, apparatus, or device. For example, the computer readable storage medium can comprise electronic, magnetic, optical, electromagnetic, infrared, and/or semiconductor systems and/or devices. More specific examples (a non-exhaustive list) of the computer readable storage medium include: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any combination thereof. Accordingly, the computer readable storage medium may be any tangible medium that can contain or store a program for use by or in connection with an instruction execution system, apparatus, or device of the present invention.

Figure 1:
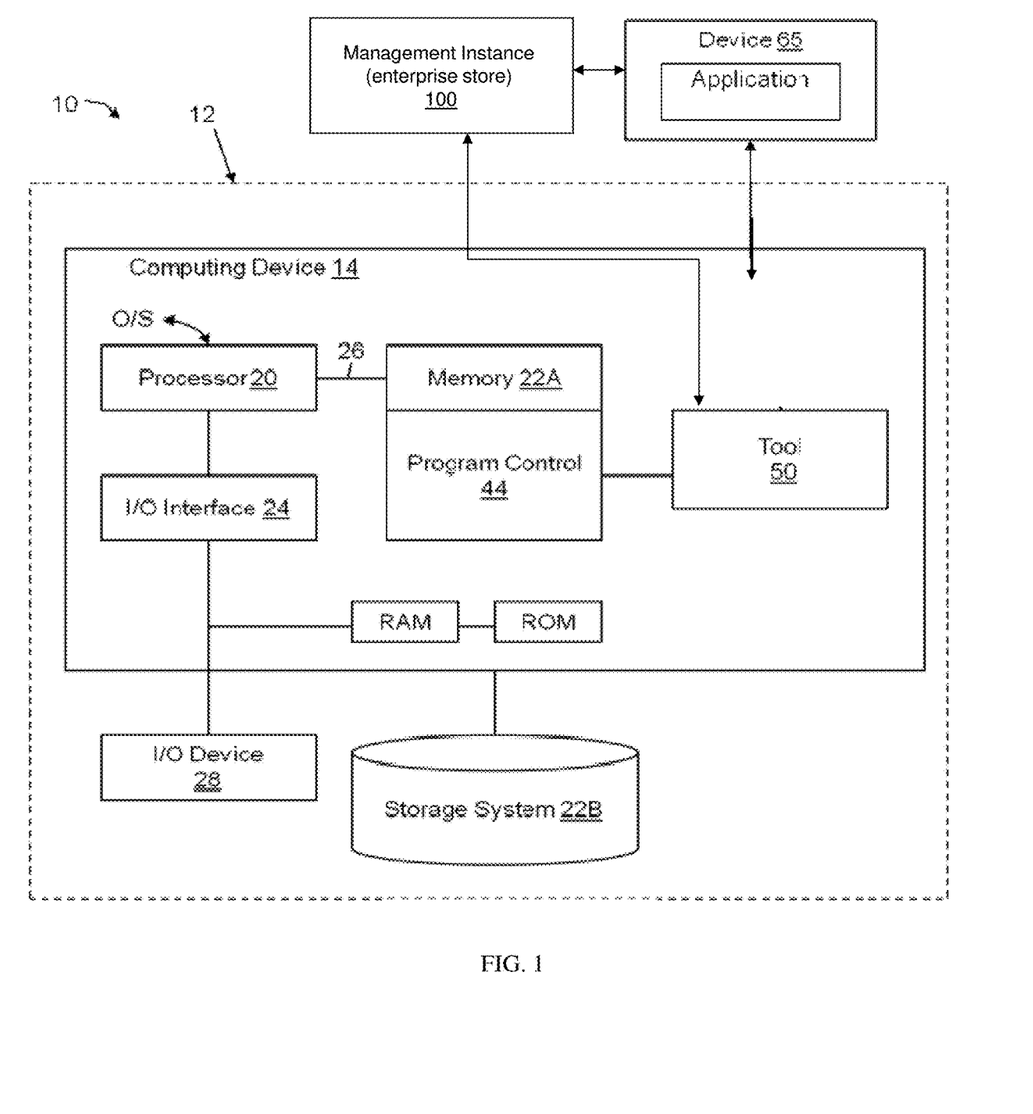
FIG. 1 shows an illustrative environment for managing the processes in accordance with the present disclosure.
Figure 2:
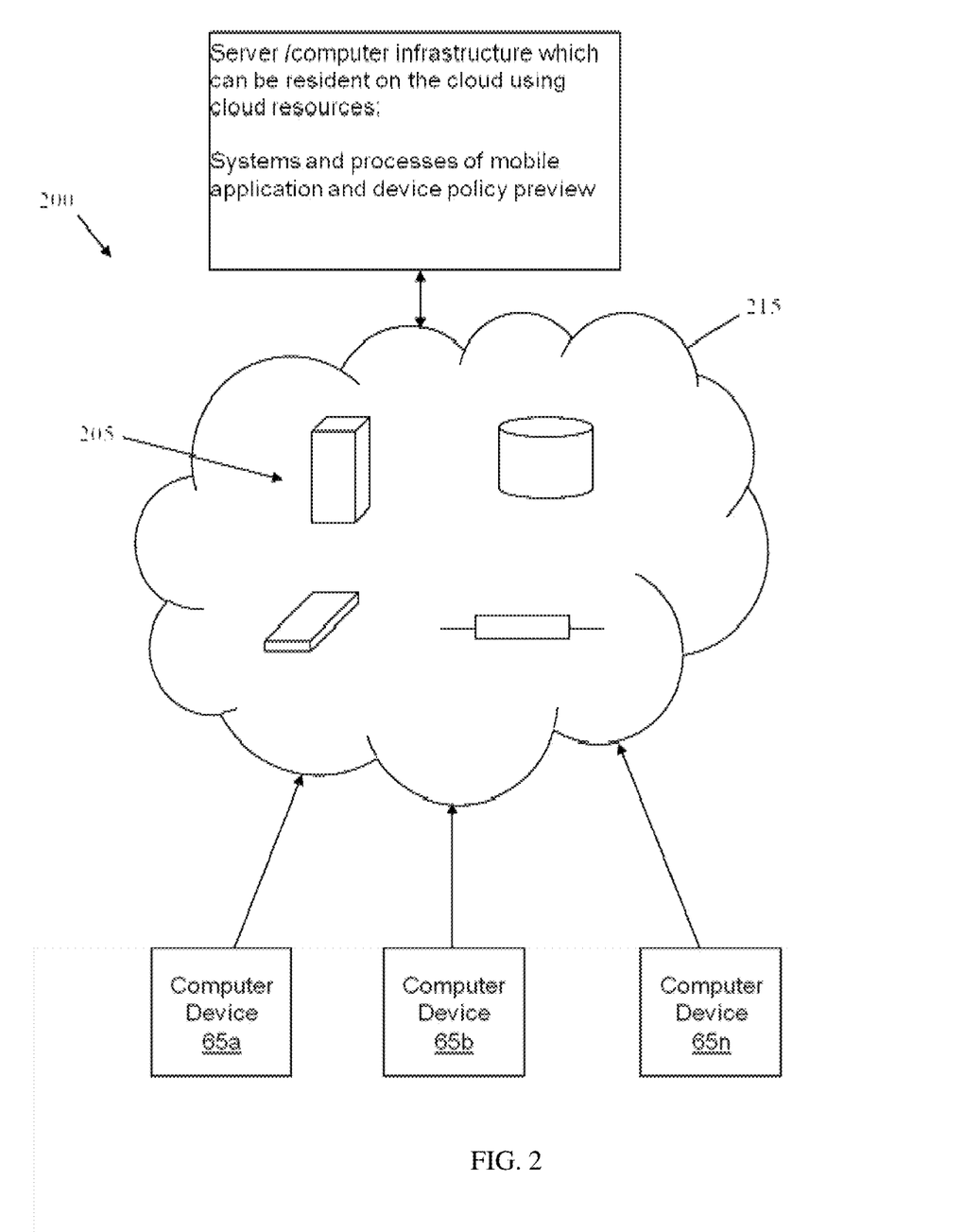
FIG. 2 shows an exemplary cloud computing environment in accordance with aspects of the present disclosure.

FIG. 1 shows an illustrative environment 10 for managing the processes in accordance with the invention. The environment 10 includes a server 12 or other computing system. The server 12 can be a standalone server, which implements the processes described herein within a networking environment. The server 12 and/or processes performed by the server 12 can be integrated into the networking environment (e.g., cloud environment) such as shown in FIG. 2 or any enterprise management system as described herein.

In specific embodiments, the server 12 can be representative of a mobile backend as a service (MBaaS), maintained by a service provider, e.g., Kony™. As should be understood by those of ordinary skill in the art, the MbaaS is a model for providing web and mobile application developers with a way to link their applications to backend cloud storage and APIs exposed by backend applications, while providing features such as user management, push notifications, and integration.

In embodiments, the server 12 can also be representative of other types of business enterprise servers, accessible via cloud based applications. For example, the server 12 can be a single, open standards-based mobile infrastructure platform. In embodiments, the single, open standards-based mobile infrastructure platform can unify multiple infrastructures/platforms together, including mobile application development platform (MADP), mobile backend as a service (MBaaS), Application Programming Interface (API) management, and platform as-a-service (PaaS) infrastructures. To this end, for example, the server 12 can be representative of Kony™ MobileFabric™ which is a converged mobile infrastructure that empowers enterprises to significantly reduce time to market. In this example, the server 12 can further integrate EMM/MAM server functions (e.g., management instances), as well as incorporate any number of enterprise stores, e.g., app store. For example, the server 12 can recognize any EMM provider with an API catalog, with publishing capabilities from a MBaaS.

In embodiments, the server 12 communicates with one or more computer device(s) 65 and one or more servers or computing infrastructure 100. In embodiments, the one or more servers or computing infrastructure 100 can directly communicate with the one or more computer device(s) 65. For example, the one or more computer device(s) 65 can upload apps directly from the one or more servers or computing infrastructure 100 and/or server 12. The computer device 65 can be, for example, a smartphone, tablet computer, personal digital assistant, or similar computing device that includes a mobile operating system, wireless communication antenna, processor, user interface, memory, etc. The one or more servers or computing infrastructure 100 can be representative of one or more standalone management instances, e.g., EMM/MAM server integrated with an enterprise store, and compatible with the server 12, e.g., MBaaS.

The server 12 includes a computing device 14 which can be resident on a network infrastructure or computing device. The computing device 14 includes a processor 20 (e.g., a CPU), a memory 22A, an I/O interface 24, and a bus 26. The bus 26 provides a communications link between each of the components in the computing device 14. In addition, the computing device 14 includes a random access memory (RAM), a read-only memory (ROM), and an operating system (O/S). The computing device 14 is in communication with the external I/O device/resource 28 and a storage system 22B. The I/O device 28 can comprise any device that enables an individual to interact with the computing device 14 (e.g., user interface) or any device that enables the computing device 14 to communicate with one or more other computing devices (e.g., devices 65, etc.) using any type of communications link.

The processor 20 executes computer program code (e.g., program control 44), which can be stored in the memory 22A and/or storage system 22B. In embodiments, the program control 44 of the computing device 14 of the server 12 controls the tool(s) 50 described herein which can be program modules, etc., comprising program code adapted to perform one or more of the processes described herein. The tool(s) 50 can be implemented as one or more program code in the program control 44 stored in memory 22A as separate or combined modules. Additionally or alternatively, the tool(s) 50 may be implemented as separate dedicated special use processors or a single or several processors to provide the functionality described herein. While executing the computer program code, the processor 20 can read and/or write data to/from memory 22A, storage system 22B, and/or I/O interface 24. In this manner, the program code executes the processes of the invention.

The program code can include computer program instructions stored in a computer readable storage medium. The computer program instructions may also be loaded onto the computer 14, other programmable data processing apparatus, or other devices to cause a series of operational steps to be performed on the computer. Moreover, any methods provided herein in the form of flowcharts, block diagrams or otherwise may be implemented using the computer program instructions, implemented on the computer readable storage medium.

According to aspects of the invention, the tool(s) 50 allows an administrator or developer to directly publish mobile apps onto, e.g., management instances 100, using a one click process and, more particularly, allows an administrator to automate app publishing (e.g., preview and production) from the server 12, e.g., enterprise central repository and server (e.g., MobileFabric™) to different, compatible management instances, e.g., EMM/MAM server 100, for subsequent uploading onto one or more targeted mobile devices 65. In embodiments, for example, the tool 50 allows an administrator or developer to one click publish an app and all its collateral (e.g., screenshots, platform specific icons, guidebooks, etc.) directly from the server 12 to a connected management instance 100. This process avoids the need for an administrator to manually upload the app binary file and collateral information. This can be accomplished by integrating various rest API's to programmatically upload an app binary and its collateral, which is built into a management instance, e.g., EMM/MAM server, into the enterprise central repository and server, e.g., server 12 (e.g., MobileFabric™), as described in more detail herein.

By way of non-limiting illustrative example, an app and its attendant collateral created in a development tool, e.g., Kony™ Visualizer™, can be uploaded to the enterprise central repository and server, e.g., server 12 (e.g., MobileFabric™). By implementing the tool 50, at any time, the app can be flagged to go into production and the developer and/or administrator of the server 12 can simply choose the app and select publish at which time the binary, its name, version, and all collateral (e.g., screenshots, icons, etc) will automatically be uploaded to a chosen management instance 100, e.g., an EMM/MAM server, without any manual hand-off required. In embodiments, the management instance 100 can be a Kony™ management instance which resides on or communicates with the enterprise central repository and server 12, e.g., MobileFabric™. The administrator can be notified that the app is available, prompting the administrator to assign user/group targeting and flag the app as live in the management instance 100, e.g., enterprise store of the management instance. In this way, it is now possible to have one click publishing performed directly from the enterprise central repository and server 12, e.g., MobileFabric™, to a connected management instance, e.g., enterprise store(s), for subsequent uploading to one or more selected devices 65.

In further embodiments, the app can be published to the enterprise central repository and server 12 or any of the management instances 100 with certain policies appended thereto. For example, the policies can include auto purging of the app from the management instances 100 at a predetermined date. In another example, the auto purging can occur at certain times or the occurrence of certain events, e.g., a previous version of an app can be auto-purged upon the upload of updated or beta version of the app. The policies appended to the app can also be uploaded to the device 65. In this situation, the policy may provide a certain expiry date, auto purge capabilities or other security features, as should be known to those of skill in the art.

Advantageously, in embodiments, the app can be published to the one or more targeted mobile devices 65 without creating internal conflicts on the device(s) 65 amongst different versions of the app, e.g., beta version and production version of the same app. This can be accomplished by automatically generating a unique identification for the app, e.g., a new bundleID, custom icon and/or other custom version or name for the app, which is different than naming conventions of related apps already residing on the mobile device 65. In such processes, the tool 50, for example, can automatically generate a new unique identification, e.g., new bundleID along with a new version name and app name, amongst other items as examples. This new identification will avoid conflict between beta test versions of apps and production versions of the app that may reside on the same mobile device 65.

In more specific embodiments, the unique identification can be generated by determining previous identification information, e.g., bundleID, name, version number, etc., of a related app by querying a look-up table, e.g., stored in the storage system 22B. Once the previous identification is found, it is now possible to provide a unique identification to the most recent version application uploaded to the server 12 to ensure that such identification is, in fact, unique to the app. In embodiments, the unique identification information will be stored in the storage system 22B for later reference.

In even more specific embodiments, the naming conventions or other unique identifications can be provided through the use of various APIs, with the identification of the previous apps known by the enterprise central repository and server 12, e.g., back end system, which is compatible with the management instances (that provide the apps to the end user devices 65). In this way, the newly uploaded app will have a unique identification and no conflicts will occur with a previous version of the app, as different identifiers are used on the mobile devices 65 to identify each of the separate apps, e.g., beta version and production version. Accordingly, an end-user can use both the apps (production and beta) on the same device 65, without any conflict on the device 65.

By implementing the processes described herein, it is possible to publish the app as a preview. This preview publication can be accompanied by a developer selecting targeted users/groups, pre-selecting an expiration date on a per user/group basis (e.g., the app is automatically removed on that date from all targeted devices), and/or flagging the app for immediate expiry, e.g., provide certain policies to the app, through the enterprise central repository and server, e.g., server 12.

By way of example, an enterprise with an in house CRM app already in production on thousands of devices 65 has an upgraded version ready for beta trial. The beta trial version can be packaged to binary form for deployment. In this example, instead of manually handing off the binary to an EMM/MAM administrator with instructions for who should receive the beta trial and for how long, the beta trial of the app can be directly published as preview to the enterprise central repository and server 12, e.g., MobileFabric™. The administrator can then be prompted to choose selected users/groups that should receive the app. Once chosen, a custom name, version number, and bundleID tagged version of the app will be automatically generated and uploaded by the enterprise central repository and server 12, e.g., tool 50, to the management instance 100, with targeting already designated and flagged as live. The users of targeted devices 65 will automatically be prompted to install the app, or it will self-install (depending on the developer's selected design). The beta trial can also include certain policies, e.g., expiry dates, usage constraints, etc.

FIG. 2 shows an exemplary cloud computing environment 200. Cloud computing is a computing model that enables convenient, on-demand network access to a shared pool of configurable computing resources, e.g., networks, servers, processing, storage, apps, and services, that can be provisioned and released rapidly, dynamically, and with minimal management efforts and/or interaction with a service provider. In embodiments, one or more aspects, functions and/or processes described herein may be performed and/or provided via cloud computing environment 200, e.g., automated app preview and publishing as described herein, and driven/implemented/provisioned on the cloud using the cloud resources 205, as described herein.

As depicted in FIG. 2, cloud computing environment 200 includes cloud resources 205 that are made available to client devices 65a . . . n via a network 215, such as the Internet. Client devices 65a . . . n may comprise any suitable type of network-enabled computing device, such as handheld computers (e.g., smartphones, tablet computers or other platforms).

Cloud resources 205 can include a variety of hardware and/or software computing resources, such as servers, databases, storage, networks, applications, and platforms as shown, for example, in the combination of FIGS. 1 and 2. Cloud resources 205 may be on a single network or a distributed network across multiple cloud computing systems and/or individual network enabled computing devices. Cloud resources 205 are typically provided and maintained by a service provider so that a client does not need to maintain resources. In embodiments, cloud resources 205 may include one or more server 12 of FIG. 1 that is specifically adapted to perform one or more of the functions and/or processes described herein. For example, the cloud resources 205 can include any combination of an enterprise central repository and server, e.g., server 12, and a management instance 100, e.g., EMM server/MAM server.

Cloud computing environment 200 may be configured such that cloud resources 205 provide apps to client devices 65a . . . n, or other computing devices through a variety of service models, such as any combination of Software as a Service (SaaS), Platforms as a service (PaaS), Infrastructure as a Service (IaaS), and/or any other cloud service models. Cloud resources 205 may be configured, in some cases, to provide multiple service models to client devices 65a . . . n, as described herein. Cloud computing environment 200 may be configured such that cloud resources 205 provide computing resources to client devices 65*a* . . . *n*, through a variety of deployment models, such as any combination of public, private, community, hybrid, and/or any other cloud deployment model.

One or more cloud resources 205 may be structured in multiple layers or functional abstraction layers, e.g., a firmware and hardware layer, a kernel layer, an infrastructure service layer, a platform service layer, and an application service layer. The firmware and hardware layer may include generic contributing nodes (e.g., data centers, computers, and storage devices) geographically distributed across the Internet and provide the physical resources for implementing the upper layers of the cloud service provider. The kernel layer may include an operating system and/or virtual machine manager that host the cloud infrastructure services. The kernel layer may control and communicate with the underlying firmware and hardware layer through one or more hardware/firmware-level application programming interfaces (APIs). The infrastructure service layer may include virtualized resources, such as virtual machines, virtual storage (e.g., virtual disks), virtual network appliances (e.g., firewalls), and so on. The infrastructure service layer may also include virtualized services, such as database services, networking services, file system services, web hosting services, load balancing services, message queue services, map services, e-mail services, and so on. The platform service layer may include platforms and application frameworks that provide platform services, such as an environment for running virtual machines or a framework for developing and launching a particular type of software application. The application service layer may include a software application installed on one or more virtual machines or deployed in an application framework in the platform service layer. The software application can also communicate with one or more infrastructure service components (e.g., firewalls, databases, web servers, etc.) in the infrastructure service layer.

Figure 3:
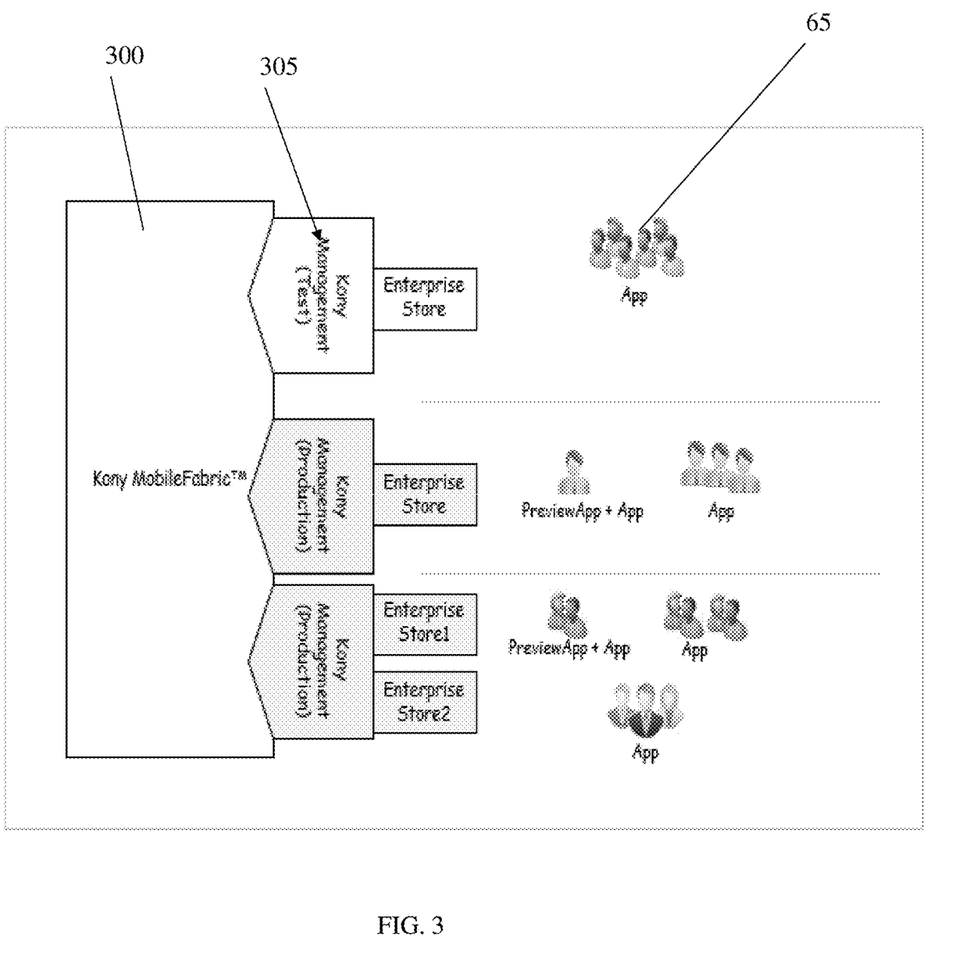
FIG. 3 shows an exemplary infrastructure in accordance with aspects of the present disclosure.

FIG. 3 shows an exemplary infrastructure in accordance with aspects of the invention. More specifically, FIG. 3 shows the relationship between an enterprise central repository and server (e.g., MobileFabric™) 300, management instances, e.g., test and production, with associated enterprise stores 305, and a plurality of user devices 65. In embodiments, the enterprise central repository and server 300 can be representative of the server 12 in FIG. 1, which can be aware of multiple EMM solutions, e.g., management instances 305, at a same time. The management instances 305 can be representative of the management instances 100 of FIG. 1, and may reside on or communicate with the enterprise central repository and server 300.

In embodiments, the management instances 305 provide apps directly to the end users, e.g., devices 65, through one or more enterprise stores, while avoiding conflicts on the mobile device. For example, the enterprise central repository and server (e.g., MobileFabric™) 300 can generate a unique identification, e.g., different naming convention, different icon or bundleID, for different versions of the same app and its collateral, e.g., beta and production. The app and it collateral can be published to the management instances 300, with its appended unique identification, and flagged as live. In embodiments, an administrator can also append any number of policies to the app, ranging from targeted users/groups to expiry and auto-purge features. The enterprise central repository and server 300 and/or management instances 305 can notify the targeted devices 65 that an app is ready for preview or publish onto the device 65. Alternatively, the app can be automatically uploaded onto the targeted devices. As the app has a unique identification, it is now possible to upload different versions of the same app on a single device without creating any conflicts.

As further shown in FIG. 3, in embodiments, multiple enterprise stores can be part of a same management instance 305 or separate standalone management instances 305. In addition, any EMM provider with an API catalog can be added as a recognized enterprise store, with publishing capabilities from a MBaaS (e.g., the enterprise central repository and server 300 or server 12 of FIG. 1) to any compatible EMM solution, e.g., management instances 305.

In embodiments, the app configurations (e.g., policies, unique identifications, etc.) and collateral information as well as backend services managed in the enterprise central repository and server 300 can be configured for respective enterprise stores of different management instances 305 in accordance with aspects of the invention. This can be accomplished by integrating various rest API's to programmatically upload an app binary and collateral built into the management systems 305 into the console of the enterprise central repository and server 300.

More specifically, management integration into the enterprise central repository and server 300 can be accomplished using an Accounts API and EMM/MAM APIs. For example, accounts APIs will assist the enterprise central repository and server 300, e.g., MobileFabric™, hook into a management instance 305. In embodiments, many-to-many combinations are supported, where one management instance can connect to multiple instances of the enterprise central repository and server 300 and vice-versa. Specifically, the following APIs are contemplated herein:

HTTP GET/api/v1/environments: This API is used to obtain the list of connections a particular EMM instance is participating in. For example, the infrastructure 300 can query an EMM server about its connectivity and authentication with the server, e.g., provide credential handshaking processes.

HTTP POST/api/v1/environments/check: This API is used to validate the compatibility (using mf version, auth mechanism, etc.) between the infrastructure 300 and a management instance, e.g., if the infrastructure can successful hook with a particular EMM instance.

HTTP POST/api/v1/environments: This API is used to set the connection data in the EMM server, e.g., management instance 305, including required security authentication keys.

HTTP DELTETE/api/v1/environmentskenvironment_guid>: This API is used to remove the connectivity and all relevant information from EMM server, e.g., management instance 305, about calling the management instance.

On the other hand, EMM/MAM APIs can be used to help the enterprise central repository and server 300 submit apps and other collateral, and correspondingly publish it to an enterprise store, e.g., management instance 305. This includes, for example, automatically generating a new unique identification, e.g., new bundleID along with a new version name and app name, amongst other items as examples, and appended policies and targeted devices. Specifically, the following APIs are contemplated for use herein:

HTTP POST/mgmt/rest/direct/app/create: This API is used to submit an app with binaries of multiple mobile platforms, and other app configurations. The app binaries and other app data (e.g., icons, screenshots, guidebooks, etc.) can be packaged into a zip file, while the app configurations can be a JSON payload. This API can be used to name the binary, and browse for the binary, screenshots, etc. (collateral) that is placed within a particular management instance 305 (e.g., EMM server).

HTTP POST/mgmt/rest/direct/app/addplatforms: This API is used to add an app's missing platform information, for example if Windows™ Phone binary was not ready when app create was triggered. Accordingly, in embodiments, this API can be used to create metadata of the particular platform to make sure that there is compatibility.

HTTP POST/mgmt/rest/direct/app/upgradeplatforms: This API is used to provide an app upgrade for an specific mobile platform.

HTTP POST >/mgmt/rest/categories: This API is used to manage the app categories. For example, this API can be used to assign a category to an app such as "marketing", "sales", etc.

HTTP POST/mgmt/rest/settings/customattributes: This API is used to manage required custom attributes. For example, this API can be used to manage specific behaviors of a device for specific operating systems, apps, etc.

HTTP GET/POST/mgmt/rest/users: This API is used to fetch the relevant users for managing/previewing app targeting from within enterprise central repository and server 300.

HTTP GET/POST/mgmt/rest/groups: This API is used to fetch the relevant groups for managing/previewing app targeting from within the enterprise central repository and server 300.

In embodiments, by using the APIs described herein the administrator can target certain specific end user devices 65 or groups of devices, whether it be for preview or publish of the app. The administrator can also specifically target one or more mobile devices 65 with specific policies appended to the app for certain targeted devices 65, e.g., certain expiry dates, auto purge capabilities, etc. Moreover, as each version of the app can have its own automatically generated custom name, version number, and/or bundleID tag, no conflicts will arise on the targeted devices 65, regardless of whether previous versions have already been uploaded to the certain device. In this latter feature, as the systems described herein are integrated, e.g., compatible, the backend systems, e.g., server 12, can automatically generate different unique identifications for different versions of an app which are already published on the management instances and uploaded onto a targeted device.

Flow Diagrams

Any flow diagrams, sequence diagrams, sequence of steps, swim lane diagrams, block diagrams, etc. should be understood as representative of implementing processing steps of the invention which can be executed, for example, from either a server, in a client-server relationship, or they may run on a user workstation with operative information conveyed to the user workstation or a cloud environment. Furthermore, steps of the processes of the invention may be implemented using a computer readable storage medium having program code for use by or in connection with a computer or any instruction execution system. The software and/or computer program product can be implemented in the environments of FIGS. 1-3, e.g., configured or provisioned on a computer infrastructure as shown in FIG. 1 or can be in a cloud environment of FIG. 2 or can be a computer program product as further described below or any combinations thereof, including within the system of FIG. 3. Moreover, the flow diagrams, sequence diagrams, sequence of steps, swim lane diagrams, block diagrams, etc. should be understood as illustrative of the architecture, functionality, and operation of possible implementations of systems, methods, and computer program products according to various embodiments of the present invention. The specific steps noted herein may occur out of the order noted, depending upon the functionality involved.

Figure 4:
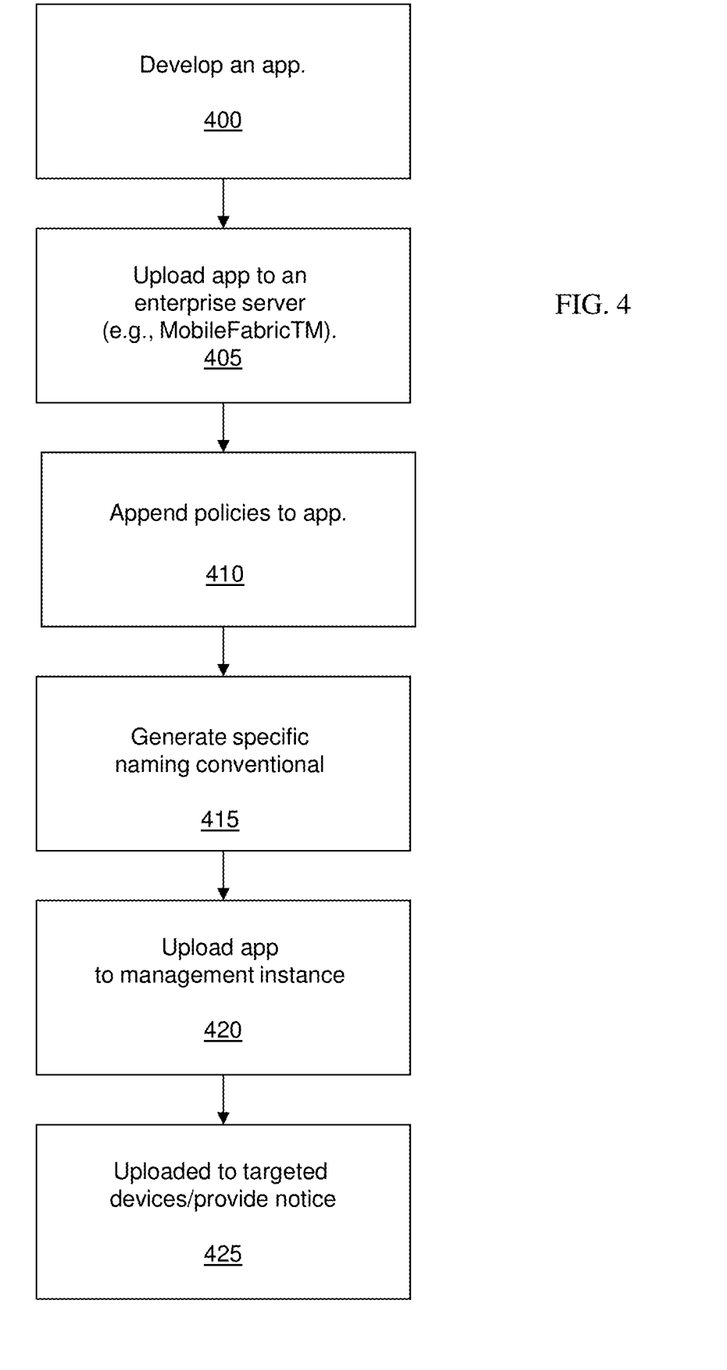
FIG. 4 is an illustrative flow chart showing steps implemented in accordance with the present disclosure.

FIG. 4 shows a flow diagram of steps implemented in accordance with aspects of the invention. In particular, at step 400, the developer develops an app on a development tool. The app can include any arbitrary identification information. At step 405, the developer or administrator uploads the app to an enterprise central repository and server (e.g., MobileFabric™). At step 410, the administrator of the enterprise central repository and server can append policies to the app. For example, the policies can include targeting of users/groups, pre-selection of an expiration date on a per user/group basis, purging of the app, and/or flag the app for immediate expiry, etc. At step 415, a new bundle ID, etc. is automatically generated along with a new version and app name, thus avoiding conflict between beta test versions of apps and production versions that may already be on devices. This way an end-user can use both the apps (production and beta) on the same device. At step 420, the enterprise central repository and server will upload the app with is unique identification information to a management instance, e.g., EMM server, with targeting already designated and flagged as live. At step 425, the app can be automatically uploaded to the targeted devices or a notice can be provided to the targeted devices to upload the app. As the app will include a unique identification information, no conflict will occur with previous versions of the app which already reside on the targeted device.

Figure 5:
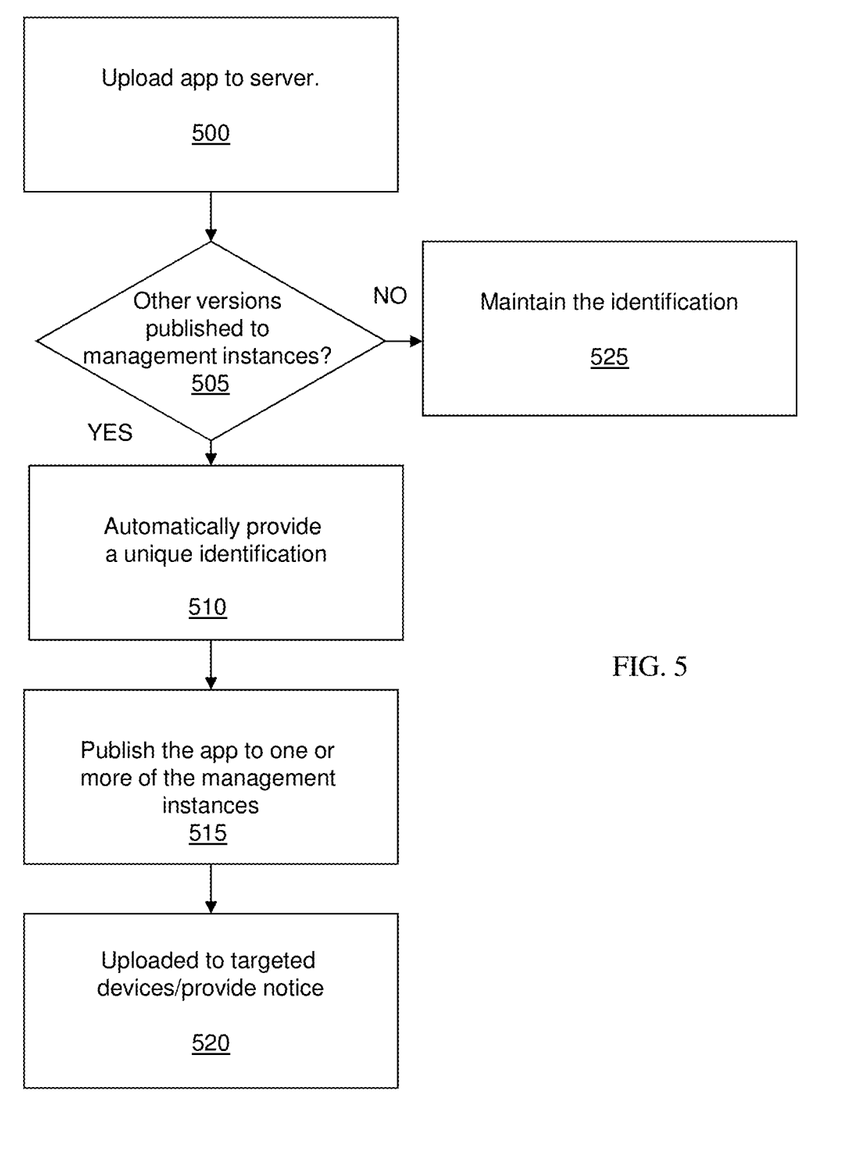
FIG. 5 is an illustrative flow chart showing steps implemented in accordance with the present disclosure.

FIG. 5 shows an illustrative flow diagram for implementing a preview flow in accordance with aspects described herein. More specifically, at step 500, the app is uploaded to the back end system e.g., server. At step 505, it is determined whether other versions of the app are published to any one or more of particular management instances. This can be accomplished by using a look up table, for example. If yes, at step 510, a unique identification, e.g., bundleID, etc., can automatically be generated. The unique identification can be generated by comparing against previous identification information (in a look-up table) to ensure that such identification is, in fact, unique to the app. At step 515, the app is published as a preview to one or more of the management instances, as defined by the administrator and flagged as live. At step 520, the app can be uploaded to one or more devices. In embodiments, the devices can be selected by the enterprise administrator, and can include targeted users or groups. If, at step 505, it is determined that no other version has been published, the back end systems can maintain the identification information provided by the developer, for example, at step 525.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

The foregoing examples have been provided for the purpose of explanation and should not be construed as limiting the present invention. While the present invention has been described with reference to an exemplary embodiment, changes may be made, within the purview of the appended claims, without departing from the scope and spirit of the present invention in its aspects. Also, although the present invention has been described herein with reference to particular materials and embodiments, the present invention is not intended to be limited to the particulars disclosed herein; rather, the present invention extends to all functionally equivalent structures, methods and uses, such as are within the scope of the appended claims.

What is claimed:

1. A method implemented in a computer infrastructure having computer executable code tangibly embodied on a computer readable storage medium having programming instructions operable to perform steps of:
receiving a request, at a back end system, to publish one or more versions of an app having a first identification provided by a developer;
determining whether one or more other versions of the app have been previously published to one or more management instances;
in response to determining that the one or more other versions of the app have been previously published to the one or more management instances, automatically publishing the one or more versions of the app to the one or more management instances in response to the request to publish the app comprising:
automatically changing the first identification provided by the developer by generating a unique second identification for each version of the app so that each version of the app has its own unique second identification, different from the first identification provided by the developer, to avoid conflicts between different versions of the app uploaded to a user device by the one or more management instances; and
automatically uploading the app and its collateral with the unique second identification to the one or more management instances which are compatible with the back end system; and
in response to determining that the one or more other versions of the app have not been previously published to the one or more management instances, maintaining the first identification provided to the app by the developer for uploading the one or more versions of the app to the one or more management instances,
wherein the determination that the one or more versions of the app has previously been published in one or more of the management instances is made using a lookup table, and
further comprising determining whether the unique second identification for each version of the app is actually unique by comparing the unique second identification for each version of the app against previous identification information stored in the lookup table for the app.

2. The method of claim 1, wherein the back end system is a mobile back end as a service (MBaaS), and wherein the automatic publishing is a one click publish operation in response to the request by a publishing tool in the back end system to publish the app.

3. The method of claim 1, wherein the unique second identification is at least one of a bundleID and a custom name created in the back end system for each version of the app.

4. The method of claim 1, further comprising uploading the app with the unique second identification to the one or more management instances with targeting information to one or more user devices and flagging the app as live.

5. The method of claim 4, further comprising one of prompting a user of the targeted one or more user devices to install the app and automatically uploading the app to the targeted one or more user devices.

6. The method of claim 1, further comprising appending one or more policies to the app at the back end system.

7. The method of claim 6, wherein the one or more policies comprise targeting of users, pre-selection of an expiration date on a per user basis, purging of the app, and/or flag the app for immediate expiry.

8. The method of claim 1, wherein the back end system uses APIs to name the app with its unique second identification and submit the apps and other collateral and publish the app to the one or more management instances which are compatible with the back end system.

9. A computer program product comprising a non-transitory computer readable storage medium having program instructions embodied therewith, the program instructions being executable by a back end system server to cause the back end system server to:
receive one or more mobile apps and collateral information in the back end system server, wherein each of the one or more mobile apps has an original identification assigned by a developer of the one or more mobile apps;
determine whether a previous version of the one or more mobile apps has already been published to at least one management instance;
in response to determining that a previous version of the one or more mobile apps has already been published to at least one management instance, generate a unique identification, in the back end system server, for each version of the one or more mobile apps, so that each version of the one or more mobile apps has its own unique identification to avoid conflicts between different versions of the one or more mobile apps uploaded to a user device by the at least one management instance, when it is determined that a version of the one or more mobile apps has previously been published to the at least one management instance; and
publish for preview the one or more mobile applications with the unique identification in the at least one management instance which is compatible with the back end system server using one or more APIs,
wherein the unique identification generated at the back end system server is different than the original identification of the previous version of the one or more mobile apps previously uploaded to the at least one management instance, and wherein, when it is determined that no previous version of the one or more mobile apps has been published, the original identification assigned by a developer of the one or more mobile apps is maintained for publishing, and
wherein the determination that the previous version of the one or more mobile apps has previously been published to at least one management instance is made using a lookup table, and further comprising program instructions to determine whether the unique identification for each version of the one or more mobile apps is actually unique by comparing the unique identification for each version of the one or more mobile apps against previous identification information stored in the lookup table for the one or more mobile apps.

10. The computer program product of claim 9, wherein the unique identification is at least one of a bundleID and a custom name created in the back end system for each version of the one or more mobile apps.

11. The computer program product of claim 10, wherein the one or more apps are published for preview to the at least one management instance with targeting already designated and flagged as live.

12. The computer program product of claim 10, wherein program instructions are executable to cause the back end system server to append policies to the one or more mobile apps.

13. The computer program product of claim 12, wherein the one or more policies comprise targeting of users, pre-selection of an expiration date on a per user basis, purging of the app, and/or flag the app for immediate expiry.

14. The computer program product of claim 9, wherein the back end system server automatically generates the unique identification and automatically publishes the one or more mobile apps in response to a one click request to the back and system server to publish the one or more mobile apps.

15. A system comprising:
a CPU, a computer readable memory and a non-transitory computer readable storage medium;
program instructions to receive a request, at a back end system, to publish one or more versions of an app having an original unique identification provided by a developer;
program instructions to determine whether one or more other versions of the app have been previously published to a management instance;
program instructions to automatically generate a unique identification, different from the original unique identification, for the app and its collateral that is uploaded to an enterprise system in response to the request to publish the app in response to the determination that a previous version of the app, which has the original unique identification, has previously been published to the management instance to avoid conflicts between the one or more received versions of the app and the previous version of the app;
program instructions to maintain the original unique identification assigned to the app in response to the determination that no previous versions of the app have been previously published to the management instance;
program instructions to automatically publish the app and its collateral with the unique identification in the management instance which is compatible with the enterprise system through a catalog of APIs; and
program instructions to flag the app as live for publishing to one or more targeted devices as defined by an administrator of the enterprise system,
wherein the program instructions are stored on the computer readable storage medium for execution by the CPU via the computer readable memory, and
wherein the determination that the one or more versions of the app has previously been published in the management instance is made using a lookup table, and
further comprising program instructions to determine whether the unique identification for the app and its collateral is actually unique by comparing the unique identification for each version of the app against previous identification information stored in the lookup table for the app.

16. The system of claim 15, wherein the unique identification is one of a bundleID and a custom name created in the back end system.

* * * * *